(12) United States Patent
Younger et al.

(10) Patent No.: US 7,873,533 B2
(45) Date of Patent: Jan. 18, 2011

(54) COMPREHENSIVE EMPLOYMENT RECRUITING COMMUNICATIONS SYSTEM WITH TRANSLATION FACILITY

(75) Inventors: John Younger, San Rafael, CA (US); Seth Taylor, San Anselmo, CA (US)

(73) Assignee: Accolo, Inc., Larkspur, CA (US)

( * ) Notice: Subject to any disclaimer, the term of this patent is extended or adjusted under 35 U.S.C. 154(b) by 898 days.

(21) Appl. No.: 11/694,849

(22) Filed: Mar. 30, 2007

(65) Prior Publication Data
US 2007/0233547 A1 Oct. 4, 2007

Related U.S. Application Data

(63) Continuation-in-part of application No. 10/258,254, filed as application No. PCT/US01/12849 on Apr. 19, 2001, now abandoned.

(60) Provisional application No. 60/198,820, filed on Apr. 21, 2000.

(51) Int. Cl.
*G06F 9/46* (2006.01)
(52) U.S. Cl. .......................................................... 705/9
(58) Field of Classification Search ...................... 705/8, 705/9
See application file for complete search history.

(56) References Cited

U.S. PATENT DOCUMENTS

| 5,164,897 | A  | 11/1992 | Clark et al. |
|---|---|---|---|
| 5,592,375 | A  | 1/1997  | Salmon et al. |
| 5,978,768 | A  | 11/1999 | McGovern et al. |
| 6,058,389 | A  | 5/2000  | Chandra et al. |
| 6,208,984 | B1 | 3/2001  | Rosenthal |
| 6,272,467 | B1 | 8/2001  | Durand et al. |
| 6,289,340 | B1 | 9/2001  | Puram et al. |
| 6,311,164 | B1 | 10/2001 | Ogden |
| 6,370,510 | B1 | 4/2002  | McGovern et al. |
| 6,381,592 | B1 | 4/2002  | Reuning |
| 6,385,620 | B1 | 5/2002  | Kurzius et al. |
| 6,457,005 | B1 | 9/2002  | Torrey |
| 6,618,734 | B1 | 9/2003  | Williams et al. |
| 6,662,194 | B1 | 12/2003 | Joao |
| 6,873,964 | B1 | 3/2005  | Williams et al. |
| 6,904,407 | B2 | 6/2005  | Ritzel |
| 6,904,497 | B1 | 6/2005  | Beckett |
| 7,043,443 | B1 | 5/2006  | Firestone |
| 2002/0046074 | A1 | 4/2002  | Barton |
| 2002/0147625 | A1 | 10/2002 | Kolke, Jr. |
| 2002/0174150 | A1* | 11/2002 | Dang et al. ................. 707/536 |

(Continued)

FOREIGN PATENT DOCUMENTS

WO    WO9917242 A1    4/1999

(Continued)

OTHER PUBLICATIONS

Dialog Brown et al "Skillful Inventory" Aug. 1999, Bank Marketing, v31n8 pp. 16-24; Dialog file 15, Accession No. 01903023.

(Continued)

*Primary Examiner*—Romain Jeanty
(74) *Attorney, Agent, or Firm*—Michael A. Glenn; Glenn Patent Group

(57) ABSTRACT

An employment recruiting communications system selectively employs language translation to support multi-cultural communications.

20 Claims, 9 Drawing Sheets

U.S. PATENT DOCUMENTS

2003/0195786 A1  10/2003  Dewar
2004/0267595 A1*  12/2004  Woodings et al. .............. 705/9
2006/0265270 A1*  11/2006  Hyder et al. .................. 705/9

FOREIGN PATENT DOCUMENTS

WO  WO0022548  4/2000
WO  WO0104811  1/2001

OTHER PUBLICATIONS

Dialog "ERP Vendor, Lawson Buys Web-Based Recruitment Firm", Mar. 1999, Computergram International, n3611, Dialog file 16, Accession No. 06201456.

McCune "A Few Good Employees"; Apr. 1998; Management Review v87 n4 pp. 38-40, 5 pages, Dialog file 15, Accession No. 01602204.

Donnely "Networking and the Net" Aug. 1999, The Magazine for Senior Financial Executives, v15, n8, p. 93.

Proquest "Recruitsoft.com Announces Van Ella Alliance for Online Candidate Background Checks" 9/200; Business Edition. Business Wire, NY; Sep. 7, 2000. p. 1.

New Web Site Pays Jobs Seeker to Help Fill High Tech, Job Openings: Nov. 1999, Business/Technology Edition, Business Wire, New York: Nov 2, 1999.

Career Rewards Partners with Local Merchants to Reach, Aug. 2000; Business Wire. Dialog 20, Accession No. I 10381700.

* cited by examiner

100

400

700

800

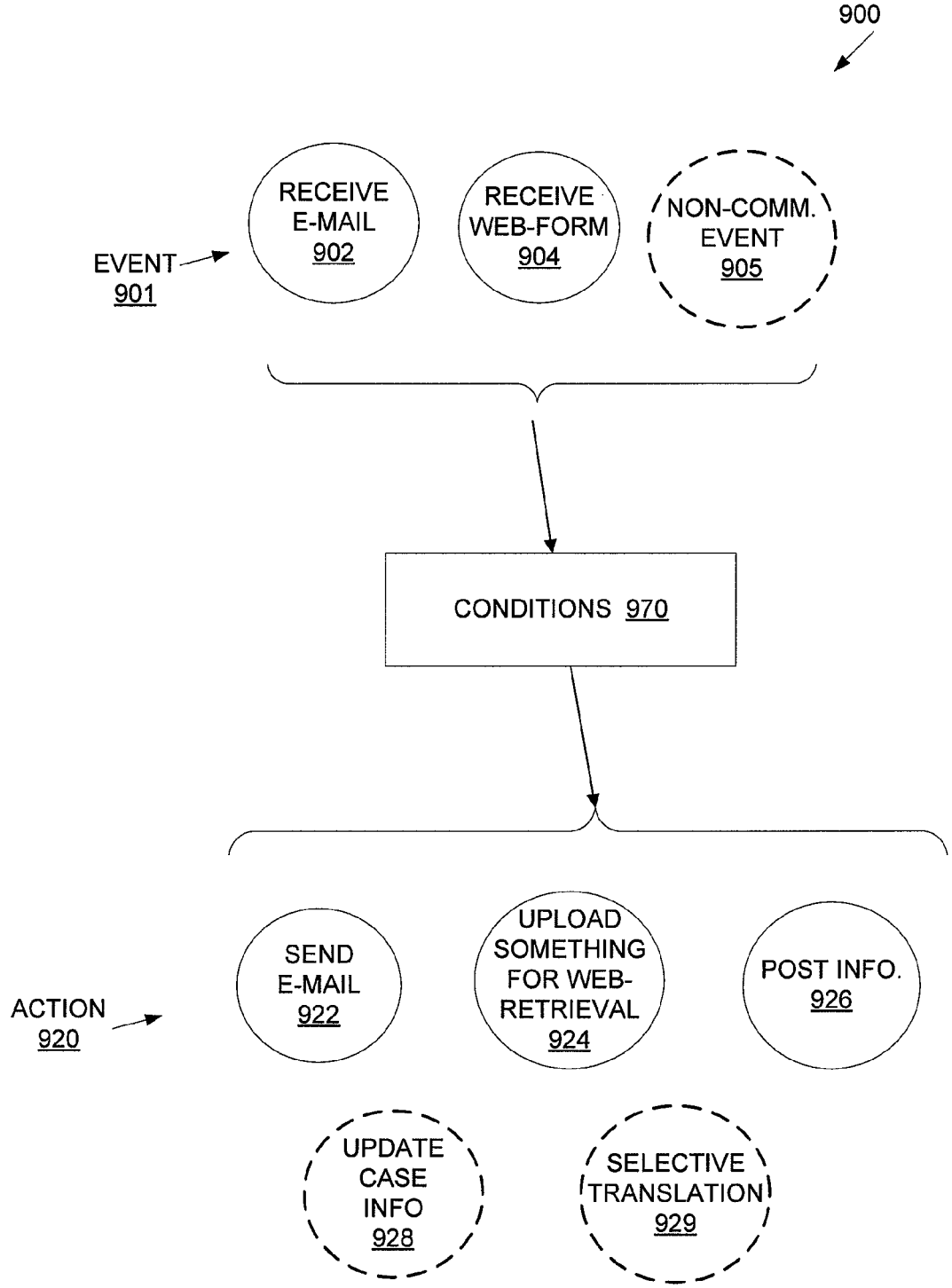

Subject: <RSKeyword> expertise — 1004

1006 —

Hi <RSFirstName>,

We are contacting you because we believe you have experience with <RSKeyword>. Given your background, we thought you may be interested in the job below, or potentially know someone that would be interested.

1008

- <JobTitle>

- <Company Name>

1010 — - <City>, <State>

If you would like to learn more about the job, apply, or refer someone, click on this link:

<referapplylink>

1012 —

Thanks in advance for your interest and referrals!

<CompanyName> and the Accolo Recruiting Team

1014 — www.accolo.com

2005 Recruitment Outsourcer of the Year

FIG. 11
1100

EEM12 - Not Confidential

Subject: <JobTitle> Job - Status of your application

Hi <JSFirstName>,

Thank you for completing the initial application for the <JobTitle> job in <City>, <State>. We have carefully evaluated your application, and based on your responses we have determined that there are others who better fit this job.

Should the requirements for this job change or if we identify other jobs, we will contact you.

Thanks again for your time and interest,

<CompanyName> and the Accolo Recruiting Team www.accolo.com

2005 Recruitment Outsourcer of the Year

COMPREHENSIVE EMPLOYMENT RECRUITING COMMUNICATIONS SYSTEM WITH TRANSLATION FACILITY

CROSS-REFERENCE TO RELATED APPLICATIONS

This application is a continuation-in-part of the following application, and claims the benefit thereof in accordance with 35 USC 120: U.S. application Ser. No. 10/258,254 entitled "Method and System Generating Referrals for Job Positions Based Upon Virtual Communities Comprised of Members Relevant to the Job Positions" and filed on Oct. 21, 2002 now abandoned in the name of John Younger.

The Ser. No. 10/258,254 application claims the benefit of the following PCT application in accordance with 35 USC 365: PCT Application PCT/US01/12849 filed on Apr. 19, 2001 in the name of John Younger. PCT Application PCT/US01/12849 claims the benefit of the following earlier-filed U.S. Provisional Application in accordance with 35 USC 119: U.S. Provisional Application No. 60/198,820 filed on Apr. 21, 2000 in the name of John Younger.

The foregoing applications are incorporated herein by reference.

BACKGROUND OF THE INVENTION

1. Field of the Invention

The present invention relates to computer-implemented systems for comprehensively managing communications related to the conduct of employment. recruiting. More particularly, the invention concerns one or more systems, methods, computer-readable media, and other embodiments of a comprehensive employment recruiting communications system that selectively employs language translation to support multi-national, multi-cultural communications.

2. Description of the Related Art

With the proliferation of the Internet, existing products and services developed a parallel presence on the Internet. Companies with paper catalogs and mail-order purchasing developed online catalogs and online purchasing. In addition to traditional paper and newsprint, many newspapers began to post their content online.

Job postings, traditionally made on local bulletin boards, paper periodicals, company newspapers, and help-wanted newspaper advertisements, appeared on Internet web pages. In addition to mere job postings, career portals sprang up. "Career portal" is a broad term, and includes various services. One example is an Internet web site that helps centralize a job search by providing links to many different job boards, career management sites, hiring corporations (internal recruiting department), recruiters, staffing companies, and other online resources. A different example of a career portal is an Internet web site of a recruiting agency. There are various other examples too, each being a different enhancement of the simple idea of an online job posting.

With the introduction of these online job postings, career portals, and the like, hiring companies and job seekers alike enjoyed immediate benefits since the job postings were easier to keep current. Indeed, postings could be continually updated, removed, or added. Also, with the immediacy of the Internet, online job postings became available worldwide to anyone with Internet access.

However, the distribution power of online job postings exceeded their practical utility. Immediate, worldwide distribution is great in theory, but what if a desirable candidate lives in Bombay and speaks Hindi? The worldwide distribution and immediate availability of an English language web site is irrelevant when it comes to meaningfully reaching this candidate. Even if the job posting is made in French, what if the hiring manager is an English speaker in New York? The hiring manager is ill equipped to evaluate the candidate's job application, in French.

Despite the significant advance that is possible by online job postings, searches, and recruiting, there are some practical limitations. And due to these unsolved problems, the known approaches are not completely adequate in some circumstances.

SUMMARY OF THE INVENTION

Broadly, this disclosure concerns an employment recruiting communications system that selectively employs language translation to support multi-cultural communications.

The teachings of this disclosure include various implementations, such as a method, apparatus, system, logic circuit, computer-readable medium, combination of these, etc. This disclosure provides a number of advantages and benefits, which should be apparent from the following description.

BRIEF DESCRIPTION OF THE DRAWINGS

FIG. 9 is a diagram illustrating the relationship between some different input/triggers and outputs and intervening conditions.

FIG. 10 is a diagram showing a sample communications template.

FIG. 11 is a diagram showing another sample communications template.

DETAILED DESCRIPTION

A. Hardware Components & Interconnections

Introduction

Figure 1:
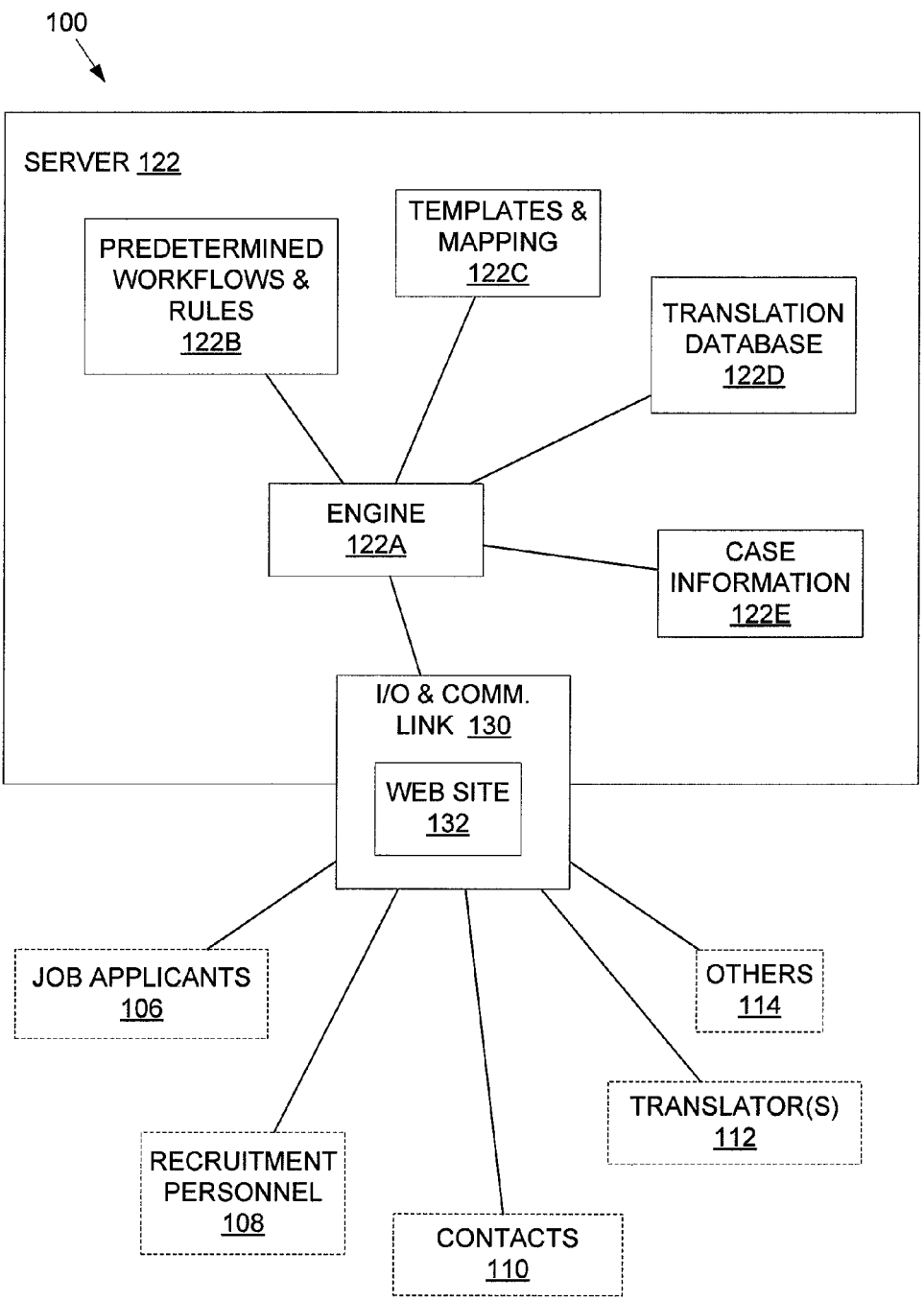
FIG. 1 is a block diagram of an employment recruiting communications system.

One aspect of the present disclosure concerns hardware to implement an employment recruiting communications system. FIG. 1, item 100, shows one example.

Broadly, the system 100 includes a communications server 122 with various subcomponents 122a-122e. Through one or more communications links 130, the server 122 interacts with various functional entities, such as job applicants 106, recruitment personnel 108, contacts 110, translators 112, and others 114. These entities 106-112 are not part of the hardware of the system 100, but are shown for completeness and ease of describing the operation of the system 100. The job applicants 106 represent people engaged in the process of applying for employment positions whose hiring is being managed by the system 100. Recruitment personnel 108 represent people on the hiring side. In one example, these are members of a recruitment process outsourcer (RPO) that is managing the entire hiring process on behalf of its client, the employer. In another example, where a single employer has an ongoing, substantial hiring need, the system 100 is operated by this employer, and the personnel 108 are members of this employer-company.

The contacts 110 represent people related to the server 122's work in finding a person to hire. Therefore, the contacts 100 include potential job applicants as well as referral sources. The translators 112 are humans that are employed or contracted by the agency operating the system 100 in order to perform on-demand translation of given text from one language or dialect to another. For ease of reference, the single term "language" is used throughout this disclosure. This is used as a term of inclusion rather than exclusion, as the concepts expressed herein are similarly applicable to differences that extend beyond language, such as dialect, locality, geography, etc. Since the entities 106-112 are non-exclusive, the system 100 may communicate with various other entities 114 as well. Despite the use of "translator" for consistency, the translator 112 may be an individual, department, agency, or other entity as appropriate.

There are various data processing components of FIG. 1, with one example being the server 122 and another specific example being the engine 122a. In this example, the remaining server subcomponents 122b-122e are implemented by data storage. Nevertheless, to alleviate processing load on the engine 122a, some or all of the other subcomponents 122b-122e may also be implemented as data processing components. These data processing components may be implemented by one or more hardware devices, software devices, a portion of one or more hardware or software devices, or a combination of the foregoing. Data storage components may be implemented by magnetic, optical, circuit, or other storage as discussed below. Exemplary data processing architecture, as well as data storage architecture, is described in greater detail below, with reference to FIGS. 2-4.

Server 122, Engine 122a, Link 130

Referring to FIG. 1 in greater detail, the server 122 may be implemented by one or more personal computers, computer workstations, computer servers, mainframe computers, distributed computing systems, a combination of these, or any other computing system suitable for the operations discussed herein. In one embodiment, the engine 122a comprises one or more processing threads, programs, subroutines, or other data processing entities.

The server 122 communicates with the entities 106-114 via at least one input/output and communications link 130 ("link"). As described below, the link 130 contemplates a broad variety of components, some at the server 122, some external to the server 122, and some spanning both. Accordingly, FIG. 1 shows the link 130 with part overlapping the server 122 and part external to the server 122. The link 130 may comprise various features and aspects such as: (1) communications interfacing hardware, such as modems, Ethernet cards, satellite or other wireless transceivers, telephony equipment, and such; (2) communications links themselves such as public Internet, Intranet, local and/or wide area network, landline and/or wireless telephone, facsimile, and the like, (3) communications interfacing software, such as e-mail messaging software, instant messaging software, etc.

Another component of the link 130 includes a web site 132. Although described in the singular for ease of reading, the web site 132 may comprise various web pages of one or more web sites. More particularly, the web site 132 provides one or multiple Internet web sites that provide a portal for use by the entities 106-114. In one implementation, the web site 132 includes multiple Internet web sites or pages, each web site or page residing in a different language. In one example, where an American company is hiring a sales representative to work in Tokyo, one web site is provided in English and a counterpart website in Japanese.

In one example, the web site 132 includes stored code such as hypertext markup language (HTML) or another appropriate language, and the engine 122a carries out the functions of the web site(s). In another example, resources of the engine 122a are conserved for other purposes, and the web site 132 represents self-sufficient web sites that operate without requiring assistance of the engine 122a. In either case, the engine 122a is nevertheless involved in the process of initiating the transmission of communications to the destinations 106-114, and acting upon communications received from the destinations 106-114 as discussed below. In this respect, the engine 122a (as mentioned above) operates according to the predetermined workflows and rules 122b.

Broadly, the engine 122a employs the subcomponents 122b-122e to coordinate communications among the entities 106-114 as described in detail below. The tasks of the engine 122a are described in greater detail below, after first introducing the subcomponents 122b-122e in more detail.

Subcomponents 122b-122e

The predetermined workflows and rules 122b determine the nature and order of tasks performed by the engine 122a. The workflows/rules 122b prescribe the necessary tasks of the engine 122a from initially posting a job opening to interviewing and ultimately hiring the best candidate. The workflow/rules 122b may be stated in the form of programming lines or objects, a state machine, a reference paradigm, a designated order, or other instructions or data.

One aspect of the templates/mapping 122c concerns various communications templates, namely, pre-written messages with various blanks to be filled at the time of completing and sending the message. To provide some examples, the communications templates may be stored in the form of XML documents, word processing files with designated fields, etc. The blanks in the communications templates may also be referred to as "fields" or "objects." The communications templates, when completed, may be delivered in the form of e-mail, instant messages, messages held at a web site and downloaded upon user demand, or another format as discussed in greater detail below. In one example, there are multiple sets of communications templates, each set representing a different language or dialect. And, in this example, each template within a set has a counterpart (meaning wise) in each of the other sets.

Another component of 122c is the mapping, which indicates the nature of data that is to be inserted into communications templates' fields. For example, if a communications template provides blanks for the job applicant's first and last names, then the mapping identifies the character of data that is appropriate first-name blank and the last-name blank.

The translation database 122d contains a list of certain words and their pre-translated counterparts. For example, the database 122d may contain common words in order to expedite operation of the server 122 by avoiding the need for a human translator 112. The translation database may comprise a text file, stack, database, linked list, lookup table, or any other data structure that is useful for the purposes expressed in this description.

The case information 122e includes one or more records indicating the status (or "state") of each employment recruiting endeavor that is underway. For example, the case information 122e might indicate when a job posting was made, who applied and when, and who was invited to an interview and when. Additional information, for example, may specify whether a job has been posted, at what stage the job is in the job lifecycle, etc. The engine 122a uses this information to determine how to progress through the workflows and rules 122b in carrying on the recruiting effort.

The case information 122e may also include user preferences. For example, the case information 122e may include the preferred language for a given person, such as a hiring manager. The case information 122e may also include applicant profiles, with specifications as to preferred language, preferred currency formation, preferred date format, and the like.

Operation of Engine 122a

Having introduced the subcomponents 122b-122e, the tasks of the engine 122a are described in more detail.

As to incoming communications, the engine 122a receives these from sources 106-114 via the link 130. In response, the engine 122a updates the case information 122e according to the nature and timing of the incoming communications to accurately reflect case status of the job search. The engine 122a uses the case information 122e as an index to determine its progress in the workflows and rules 122b, and determine what to do next. In some circumstances, the workflows and rules 122b call for manual translation of incoming messages. In this case, the engine 122a initiates and obtains manual translation from a human translator 112. In other cases, the engine 122a obtains spot translation of incoming messages by using the translation database 122d.

As explained below in greater detail, the system creates member profiles of different user types from various sources. A job seeker creates a member profile when signing up and applying for a job. An administrator creates a translator member when configuring a translator for specific languages. A recruitment coordinator creates a hiring member when configuring a company profile. Ultimately, the engine 122a creates workflow based on the state of the system and the type of person that must handle the action.

In contrast to inbound communications, the workflows and rules 122b in other circumstances call for outbound communications. In this case, the engine 122a retrieves one or more communications templates 122c and fills-in the templates with case information 122e according to the mapping 122c. As prescribed by the workflows and rules 122b, the engine 122a may obtain spot translation of some words before filling-in the template in the destination language. The engine 122a can transmit the message by sending email, sending an instant message, queuing messages at the web site 132 for user retrieval, transmitting a fax, placing a telephone call to deliver a machine annunciated message, or invoking other electronic means.

Exemplary Digital Data Processing Apparatus

As mentioned above, the server 122, engine 122a, and any other data processing entities may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
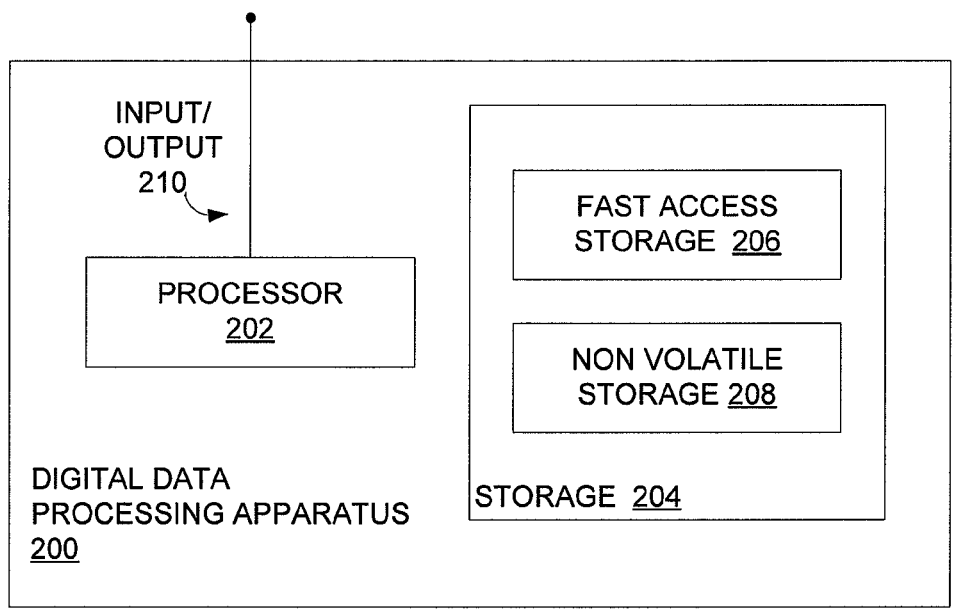
FIG. 2 is a block diagram of one digital data processing machine.
Figure 3:
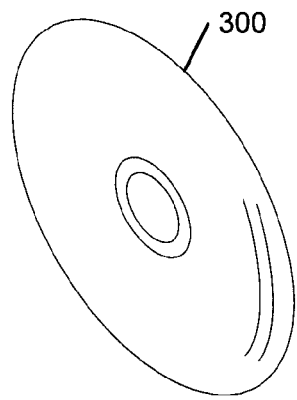
FIG. 3 shows one signal-bearing medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, or other means for the processor 202 to exchange data with other hardware external to the apparatus 200.

Computer-Readable Media

As mentioned above, various instances of digital data storage may be used, for example, to implement components such as 122b-122e (FIG. 1), to embody the storage 204 and 208 (FIG. 2), etc. Depending upon the application, this digital data storage may be used for various functions, such as storing data, or storing machine-readable instructions. These instructions may themselves aid in carrying out various processing functions, or they may serve to install a software program upon a computer, where such software program is then executable to perform other functions related to this disclosure.

In any case, the computer-readable media may be implemented by nearly any mechanism to digitally storage machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to computer-readable media that contain machine-executable instructions (as described above), a different embodiment uses logic circuitry to implement digital data processing features.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
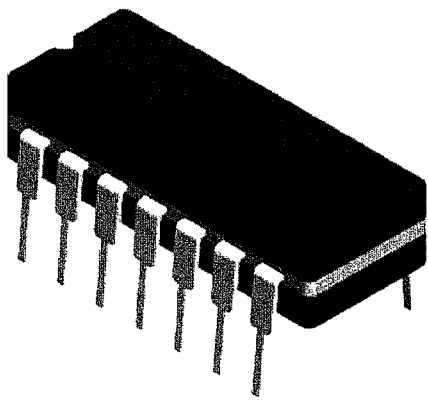
FIG. 4 is a perspective view of one logic circuit.

FIG. 4 shows an example of logic circuitry in the form of an integrated circuit 400.

B. Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Translation, Broadly

Figure 8:
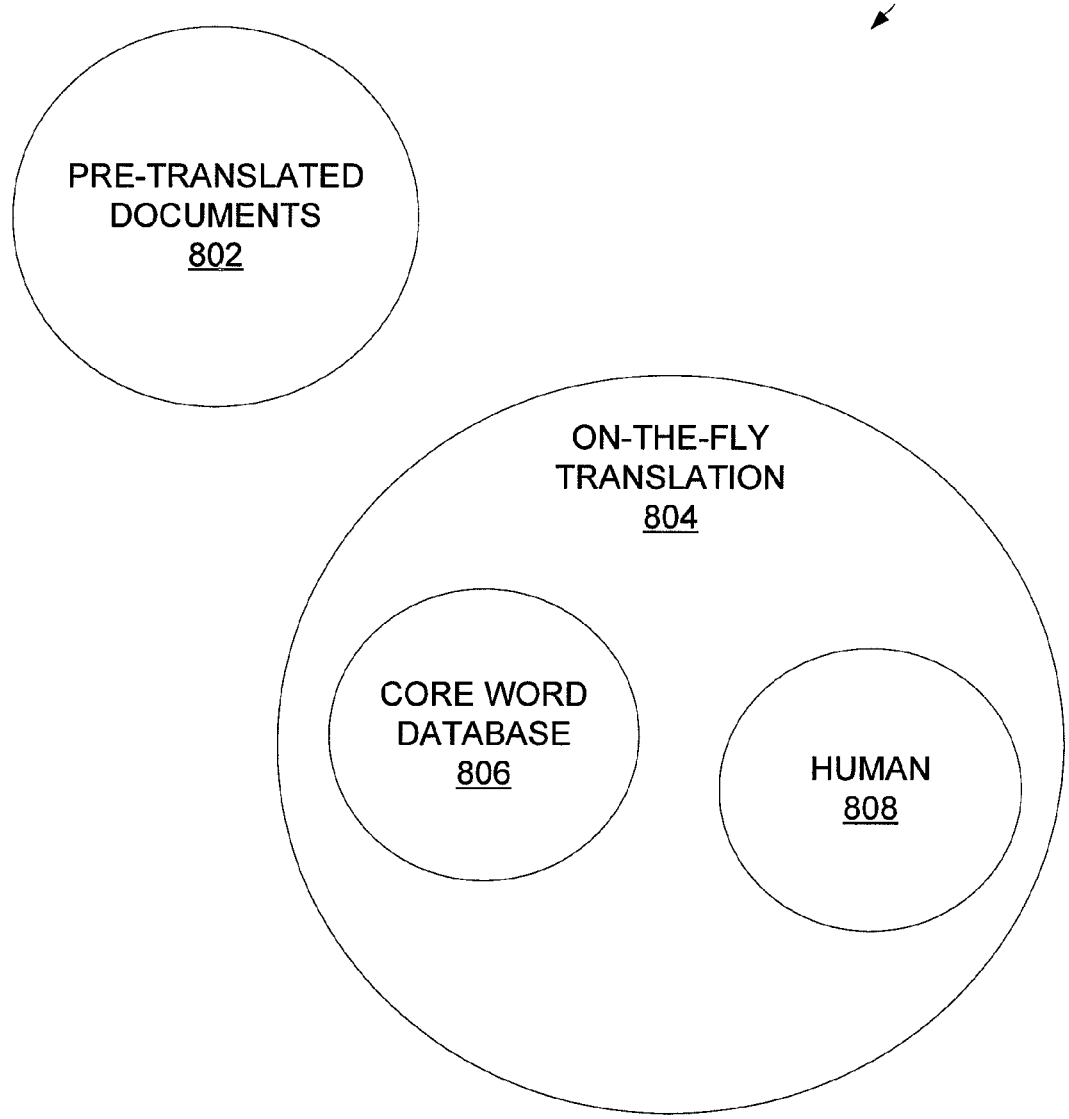
FIG. 8 is a diagram illustrating some different types of translation.

FIG. 8 broadly illustrates how the comprehensive employment recruiting communications system 100 selectively employs language translation to support multi-national and/or multi-cultural communications. The system 100 utilizes a combination of pre-translated documents 802 and on-the-fly translation 804.

Some examples of the pre-translated documents 802 include the presentation of different web sites 130 (or web pages) in different counterpart languages. Another example of pre-translated documents 802 includes the pre-prepared communications templates 122c having counterparts in different languages.

As to translation on-the-fly 804, one example is the operation where the engine 122a invokes the translation database 122d to look up translations of various words for insertion into the templates 122c. Another example of translation on-the-fly 804 is the operation if the engine 122a invoking a human translator 112 to translate a job description for posting, or an applicant's application packet for evaluation.

Coordinating Inbound/Outbound Communications

FIG. 9 broadly illustrates various events 901 that stimulate action by the comprehensive employment recruiting system 100, and the resultant actions 920 that the system 100 takes. FIG. 9 also illustrates the relationship between events 901 (input) and actions 920 (output). The workflows 122b prescribe the relationship between events 901 and actions 920.

Events 901 include different types of communications such as receiving e-mail 902, receiving notice of a person completing a web-form 904, etc. Events 901 may also include non-communication events 905 such as an event or state. Some examples include arrival of a predetermined time/date, the event of a job being filled, the event of a candidate decision being made, the status or quality of flow of applicants, the progression of a job search from one stage to another, etc. One example of an event that includes arrival of a predetermined time/date is the arrival of a translation deadline.

Actions 920 include different types of actions taken by the server 122, which includes non-communications actions as well as the transmission of communications. As to communications output, some examples include sending an e-mail 922, uploading 924 something for another person to retrieve via the web site 132, and posting web information 926 on a web site. In a more specific example, the email output 922 may include an email that directs the recipient back to a specific web page or site. As to non-communications output, some examples include updating 928 the case information 122e and conducting translation 929.

Broadly stated, the occurrence of any event 901 may trigger one or more of the actions 920, depending upon whether certain conditions 970 are met. The conditions are set forth by the workflow and rules 122b, and particularly, the specific progression of the workflow/rules 122b according to the specifics of the case information 122e.

For example, a job applicant may send an e-mail inquiry as to the status of her employment application. The server 122's receipt of this e-mail is represented by 901. In this case, the conditions 970 prescribe a designated e-mail response (922) based upon a particular communications template 122c. More particularly, the conditions 970 are manifested by the workflow/rules 122b indexed against the case information 122e, having the effect of specifying a designated response via an appropriate one of various communications templates 122c. If (according to case information 122e) the job applicant speaks another language than is used to store the case information 122e, then the conditions 970 dictate that the server 122 translate (929) text into the job applicant's language before filling-in the blanks of the outbound communications template. Here again, the conditions 970 are carried out by the workflow/rules 122b as indexed by the case information 122e.

To give another example, recruitment personnel 108 may upload job information through a web form. Receipt of this data is represented by 901/904. In this case, the conditions 970 prescribe that translation (929) should occur, and moreover, that the server 122 should invoke a designated human translator 112 to translate the job information.

The following vignette provides another example of various events 901, actions 920, and intervening conditions 970. In one embodiment, whenever a hiring manager or recruitment personnel adds or edits a translatable object to the system 100, this constitutes an event 901. In all cases (the condition 970), the server 122 automatically sends an alert to the translator 112 (one action 920). The server 122 also registers a task in the translator's task list (another action 920). This enables translation to occur separate from the creation or forwarding of messages. In the case of an object that the recruitment personnel or hiring manager has edited (a condition 970), the action 920 may specify that the server 122 creates a document where the edits are highlighted to indicate to the translator what has changed and what needs to be retranslated. This functionality may be similar, for example, to a word processing feature that tracks document changes of different reviewers. For example, the server 122 may highlight text in one color when something has been added, and put a strike-through over text when something is deleted.

General Purpose Computing Sequence

Figure 5:
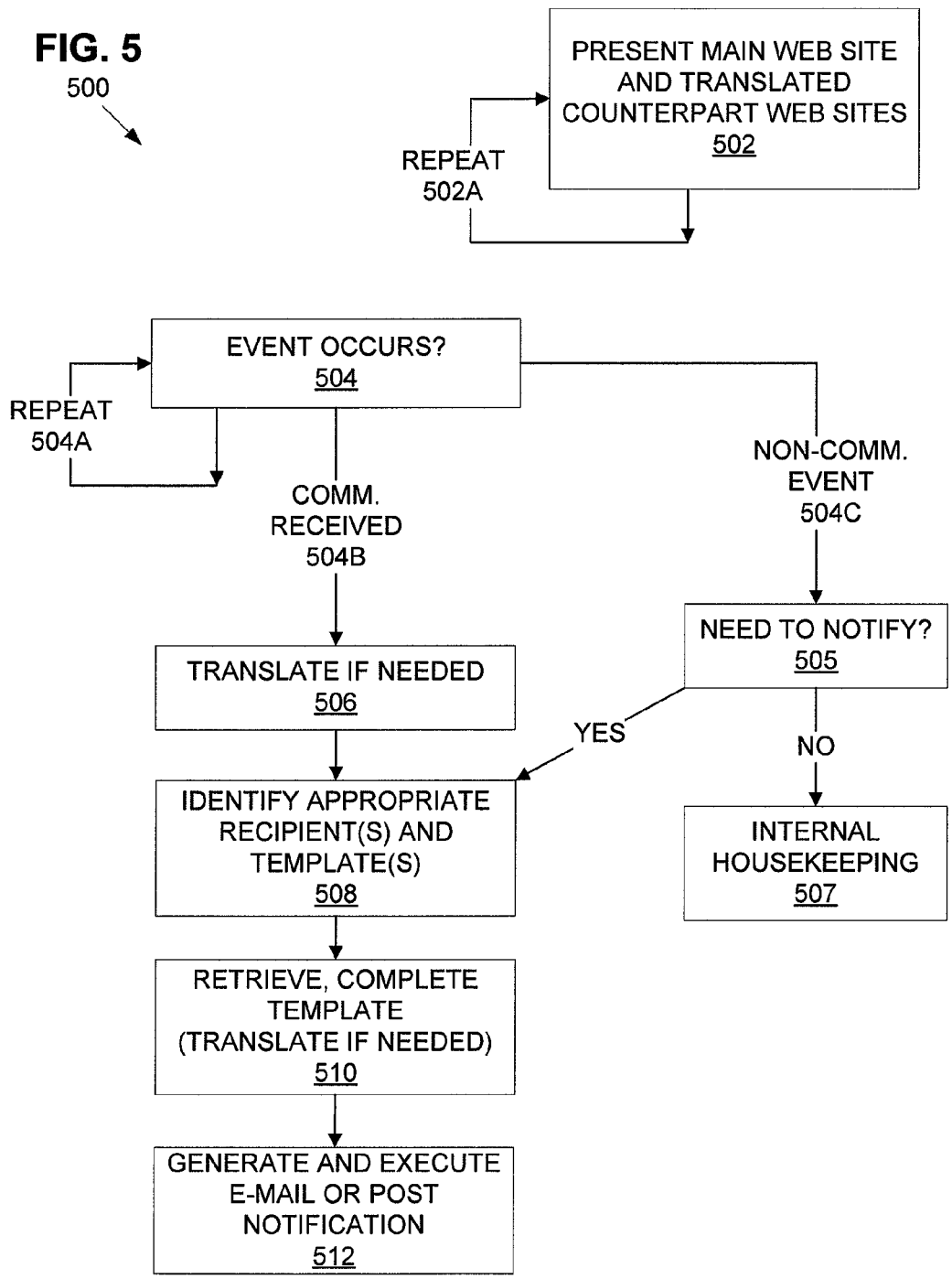
FIG. 5 is a flowchart of a sequence for operating an employment recruiting communications system.

FIG. 5 shows a sequence 500 to illustrate an overall sequence of operating an automated employment recruiting communications system. The sequence is described as a "general purpose" computing sequence because the following can be completely customized: (1) input triggers relevant to the system, (2) output actions taken by the system, and (2) relation between the two. Ultimately, then, system architects design the workflows and rules 122b to suit the intended application. Thus, the system may be implemented in many different ways to carry out operations of different flavors of automated employment recruiting communications system.

For ease of explanation, but without any intended limitation, the example of FIG. 5 is described in the specific context of the system 100 described above.

In step 502, the server 122 and/or link 130 present the web site 132 to serve as a communications portal for intercommunication by the entities 106-114. The web site 132 may also include one or more counterpart web sites or web pages with similar content in different languages, dialects, or other formatting for people of different nations, cultures, regions, locales, etc. Web site presentation (502) is ongoing, as shown by 502a.

Apart from web site presentation 502, there is another series 504-512 in which the server 122 processes events and takes appropriate action. In step 504, the server 122 receives notice of an event. As discussed above in conjunction with FIG. 9, events may involve received communications (such as e-mail 902, web-form submissions 904, and the like) or non-communications events such the arrival of a time or date, occurrence of an event, existence of a given state, etc.

Action that the server 122 takes in response to the event 504 is prescribed by the workflow/rules 122b as indexed by the current situation, that is, the case information 122e. If the event 504 involves received communications (504b), the server 122 translates using the translation database 122d or invokes a human translator 112. In one example, the system employs a human translator 112 for certain communications (specified by 122b), and the translation database 122d for other communications. For instance, user-completed forms, emails, resumes, and other simpler communications may be appropriate for translation by the database 122d, whereas applicants' free-form responses (such as essay paragraphs describing themselves) would be appropriate for human translation. The workflows and rules 122b may specify other criteria for human versus machine translation, however, as desired by system architects.

If the event 504 does not involve received communications (504c), step 505 asks whether there is a need to notify anyone of the event 504. If not, step 507 conducts any required housekeeping, such as updating the case information 122e, feeding the current status into a knowledge base, record keeping, managing metadata, data analysis, or nothing at all.

On the other hand, if there is a need to notify someone (505), then the sequence 500 rejoins to the sequence 506-514 that is performed upon receipt of communications. Joining occurs in step 508.

In step 508, the server 122 identifies the appropriate recipient and template 122c. This is determined by the engine 122a referencing the workflow/rules 122b as indexed by the case information 122e. Then, in step 510 the engine retrieves and completes the identified template 122c. Here, the engine 122a invokes the translation database 122d to perform any needed translation of words before inserting them in the selected template. In step 512, the engine 122a generates and executes the outbound communication, such as sending an e-mail message or posting a message on the web site 132 for secure user retrieval.

SPECIFIC EXAMPLE

The example given above in FIG. 5 illustrated a general purpose sequence for operating an automated employment recruiting communications system. This being a general purpose sequence, the system is capable of operating in a variety of different ways.

Figure 6:
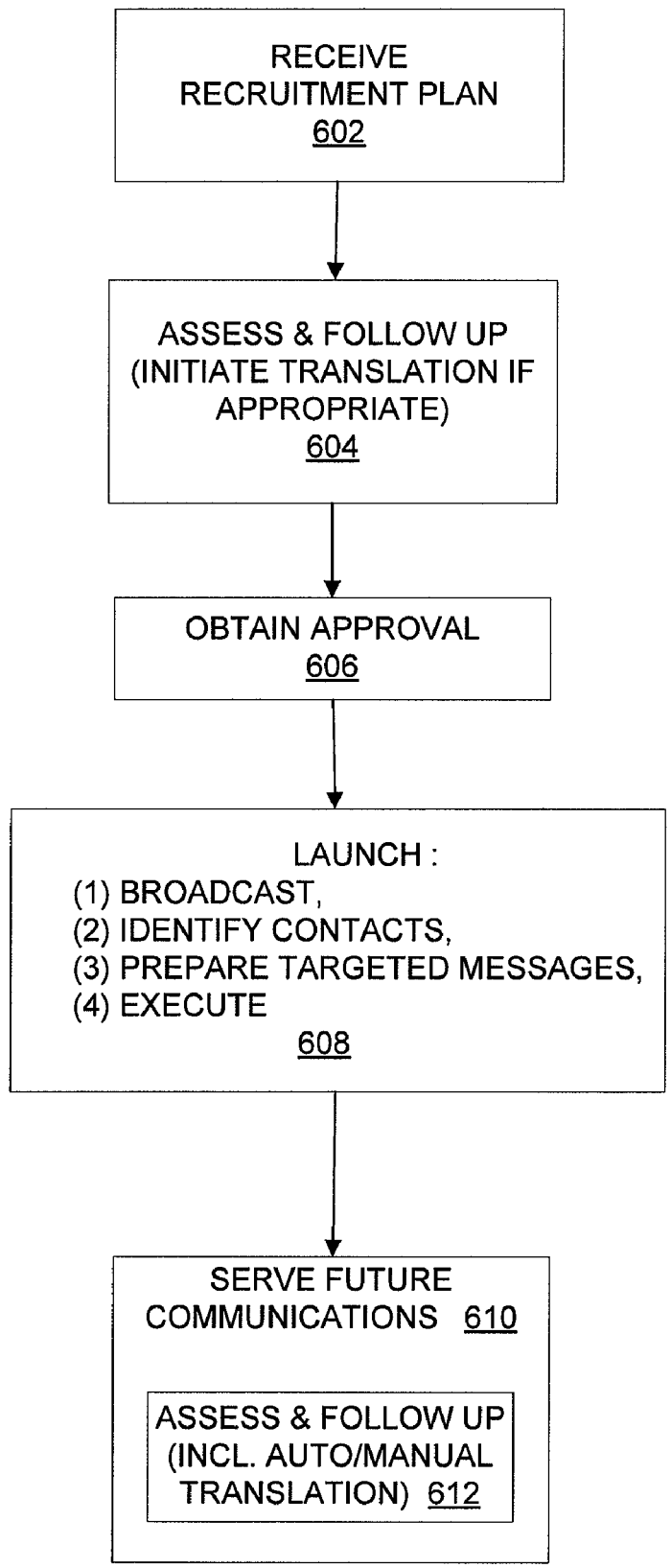
FIG. 6 is a flowchart illustrating a more specific example of a sequence for operating an employment recruiting communications system.

FIG. 6 shows the resulting operating sequence for the system 100 after having been configured to observe a specific character of automated employment recruiting process. FIG. 6 provides an overview, illustrating this process 600 from beginning to end. Of course, the progression of the process 600 will involve repeated passes through the general purpose operating sequence 500.

The steps are initiated in step 602, when the server 122 receives computer-readable communications setting forth a recruitment plan in English or another source language. In one embodiment, recruitment personnel 108 submit the recruitment plan to the server 122 via the web site 132. As an alternative to the web site 132, another mode of electronic communications may be used, such as email, instant message, facsimile, etc.

In this example, the recruitment plan includes (1) a description of a given job, (2) an applicant screening questionnaire specific to the given job, and (3) various behavioral-based questions. In one example, the questionnaire is a series of multiple choice questions. The recruitment plan also specifies where the worksite is located, and the geographical proximity required of candidates. Further, job profile information may be folded into components of the recruitment plan, with some examples including a timeline for the recruiting process, the metrics for measuring success of an applicant, why the right person would want the job, and attributes of top performance in the company. The recruitment plan may further contain various options specified by the hiring manager or recruitment personnel. For instance, the recruitment plan may specify the destination languages for translation of the job information, whether candidate resumes and responses will be translated and which languages of translation, etc. The server 120 stores this information in the case information 122e.

In step 604, the server 122 assesses the recruitment plan to make sure it is complete, and also initiates translation if appropriate. Whether or not translation is appropriate is specified by the workflow/rules 122b as applied to the specific case information 122e, or manually by instruction from the hiring manager or recruitment personnel. In one example, translation of the recruitment plan is mandatory if the server 122 determines that a prescribed geographical job search area includes regions outside the recruitment plan's source language. The server 122 initiates translation, if applicable, by electronically transmitting the recruitment plan along with a translation request to a human translator 112. In one example, the server 122 makes the decision to invoke a human translator 112, rather than the database 122d, because the workflow/rules 122b specify that recruitment plans must be manually translated in all cases.

In addition to the translation of words and their meaning, translation of step 604 may implement various language and localization specific items, such as text, numbers, currency, dates and times, address formats, postal codes, telephone number formats, and the like. In one example, step 604 only obtains translation of the job description and key words of the recruitment plan. Here, recruiting personnel 108 have arranged for pre-translation of the screening questionnaire so further translation is not required. In another example, step 604 may translate the entire recruitment plan. In another example, step 604 skips translation entirely. The choice between these different options, in one example, is based on the need for locale-specific information as specified in the case information 122e (per the recruiting personnel or other contacts).

In step 606, the server 122 forwards the recruitment plan to appropriate recruitment personnel (translated if applicable) for approval. Accordingly, one aspect of the recruiting plan that is subject to approval is the translation output. One example of an approver is a hiring manager of the hiring company, and another example is a member of the RPO recruiting team. Whether and when this is done, along with identification of the appropriate reviewer, is specified in the workflow/rules 122*b* as indexed by the case information 122*e*. Continuing with this embodiment, the server 122 waits for approval (606) of the recruitment plan. The server 122 may receive approval (step 606) in the form of e-mail 902, web form submittal 904, or other communications as discussed in conjunction with FIG. 9 above.

Upon approval of the recruitment plan, the server 122 launches the job search (608). This includes a number of acts. For one, the server 122 makes the recruitment plan available to job applicants, potential referral sources, contacts, and other by posting some or all of the recruitment plan the web site 132. In one example, this includes posting the job description and applicant questionnaire on the web site 132 to reach applicants that regularly review the web site 132, and to assist applicants in applying for the posted job through the web site 132. As another example, the server 122 additionally posts the job description on web sites external to the system 100 to reach many possible targets; such postings may include job boards, user groups, alumni associations, professional organizations, etc.

Another component of the launch (608) is a step of identifying people likely to know or be a candidate for the described job, who reside within a threshold proximity of the specified job site. This and various other components of the sequence 600 may be performed as discussed one or more of the following U.S. Patents assigned to Accolo, Inc.: (1) U.S. Pat. No. 7,188,074 issued Mar. 6, 2007 in the name of John Younger, (2) U.S. Pat. No. 7,149,703 issued Dec. 12, 2006 in the name of John Younger, (3) U.S. Pat. No. 7,027,998 issued Apr. 11, 2006 in the name of John Younger. Each of the foregoing patents is incorporated herein by reference.

After these people have been identified (still in step 608), the server 122 performs an act of retrieving and completing one or more pre-stored templates 122*c* to form personalized electronic solicitations directed at the identified people. The server 122 invokes the translation database to fill-in any blanks in the appropriate target languages and locales, and thereby construct appropriate messages reflecting dialect, culture, and style appropriate to geographical location of the identified people. Finally in step 608, the server 122 transmits the completed solicitations to the identified people in the form of e-mails, facsimile messages, web-postings, etc.

The system 100 may observe various options for launching a job search, which may be selected by recruitment personnel or the hiring manager and documented in the case information 122*e*. Or, the server 122 may be programmed to always perform one option or another. In one option, launching of the job search entails the following: the job description is sent without delay to known entities that have registered desire to receive job listings in the source language with locale specific information. Job listings are also sent to entities with other language preferences, but only as translated job descriptions and keywords arrive in the system. In another option, step 608 waits until the translation (initiated in step 604) is completed, then sends the job descriptions and key words to all entities who have registered a desire to receive job listing in source or any of the target languages with locale-specific information. In either option, or for people whose language preference is unknown, step 608 only sends the job descriptions if the people live in a region where the recruitment plan's source language is spoken.

In one embodiment, the job search is launched repeatedly, while iteratively expanding the required threshold proximity required of candidates. Thus, the system 100 can automatically widen the job search. This may be performed according to elapsed time, volume or character of applicant response to the job search, or another factor. In each re-launch of the job search, the launch is conducted according to all appropriate languages encompassed by the expanded proximity.

After launching the job search, the server 122 acts (step 610) as a central communications server to observe a predetermined workflow for the tasks of collection, evaluation, relay, generation, and notification regarding communications arising from the job search and occurring between and among some or all of the entities 106-114. As part of step 610, the server 122 assesses (612) future communications to determine which action to take according to the workflow/rules 122*b* and case information 122*e*.

In some cases, before transmitting outbound communications arising from the job search, the server 122 obtains translation specific to the targeted recipient by performing one or more of the following: (1) invoking the translation database 102*d* to apply stored localization rules to adjust content of said further communications, (2) initiating and obtaining translation by a human translator 112 to translate said further communications. For example, the server 122 may initiate translation of an incoming job application if it exists in a different language than that of the hiring manager or recruitment personnel 108. In another example, the server 122 only initiates translation of an incoming job applications on request by a hiring manager or recruitment personnel 108.

Completing Stored Templates

Figure 7:
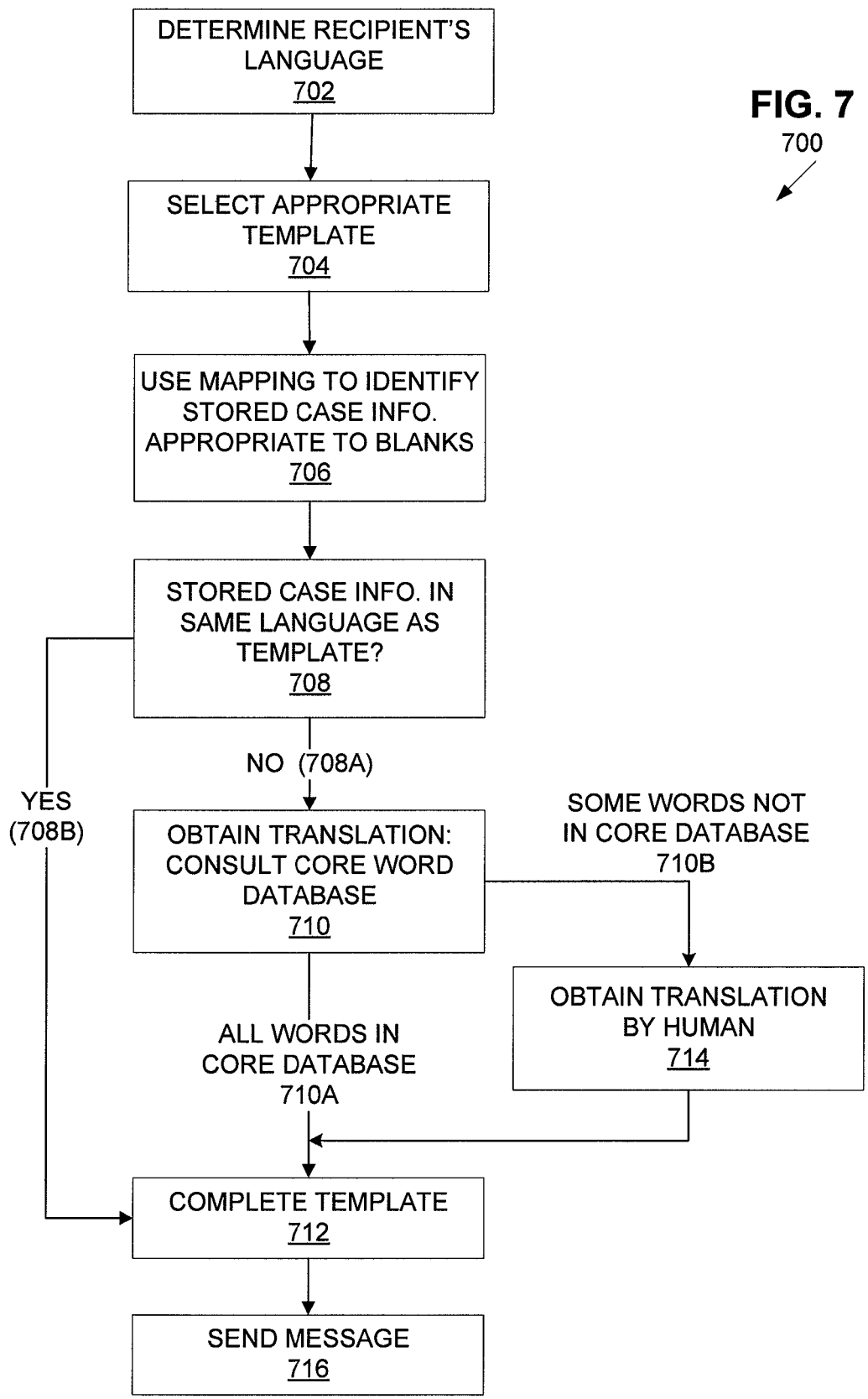
FIG. 7 is a flowchart of an exemplary sequence for completing a stored communications template.

FIG. 7 shows one example of a sequence 700 for selecting and completing templates 122*c*. For purposes of this example, the steps 700 are performed by the server 122, and specifically, the engine 122*a*.

Step 702 determines the appropriate language of the intended recipient of the template that is being prepared. In one example, this is performed by referencing data stored in the case information 122*e*. Step 704 selects the appropriate one of the templates 122*c*. This is determined by referencing the workflow/rules 122*b* in relation to the case information 122*e*.

For instance, the workflow/rules 122*b* will specify that, upon approval of a job applicant by appropriate representative of the recruitment personnel 108, then a given template must be used to request an interview with the applicant. The case information 122*e* indicates whether or not an applicant's case has reached this point. When it does, then the workflow/rules 122*b* identify an appropriate one of the templates 122*c*.

With the appropriate template selected (step 704), then step 706 works to identify the appropriate information for filling-in the blanks. This is achieved by considering each field of the template, and using the mapping to determine which case information 122*e* is appropriate to fill-in that field. Some guidance in completing this operation is available by reference to the above-cited U.S. Patents.

After step 706, step 708 determines whether the case information 122*e* selected in step 706 is in the recipient's language. The recipient's language, as mentioned above, is specified in the case information 122*e*. If the case information 122*e* resides in the recipient's language (708*b*), then step 708 jumps to step 712, where the template is filled-in. Step 712 is described below.

If the case information 122*e* resides in a different language (708*a*), however, the server 122 performs or arranges for translation. Namely, step 710 first consults the translation database 122*d* in an attempt to translate the data from 706. If this succeeds (710*a*), then step 712 uses the translated words from the translation database 122*d* to complete the selected template. On the other hand, if the translation database 122*d* does not contain translations for the necessary words (710b), then the server 122 arranges for translation by a human translator 112 in step 714. After step e714, step 712 uses the translated words from the human translator (from step 714) to complete the selected template.

Step 716 next uses the completed template from step 712 to send a message. In one example, step 716 transmits an e-mail message where the e-mail's content is the template. The identity of the addressee is determined from the case information 122e. In a different example, step 716 prepares an electronic message comprising the completed template and posts the message at the web site 132 or caches the message at the web site 132 for recipients to retrieve. The message may be available for all to read, or restricted to retrieval by the recipient upon entry of given security credentials.

TEMPLATE EXAMPLES

FIGS. 10-11 show some exemplary templates. The template 1000 is an exam pie of a message that is transmitted to launch a job search (item 508, FIG. 5; item 608, FIG. 6). The message contains an identifier 1002 and number of fields 1004-1014. The mapping 122c indicates which data from the case information 122e is appropriate to each field 1004-1014.

The field 1004 is a blank for insertion of a referral source keywords, such as "telecomm sales." The field 1006 is a blank for insertion of the addressee's name. The field 1008 is a blank for insertion of the job title. The fields 1010 are blanks for insertion of hiring company's name, city, and state. The field 1012 is a blank for inserting a hyperlink to a web page 132 containing an interface for the message recipient to apply for the job or make a referral. The field 1014 is another reference to the hiring company's name.

Referring to FIG. 11, the template 1100 is an example of a message that is transmitted in order to reject (item 510, FIG. 5) a person who has completed an initial job application. The message contains an identifier 1101 and number of fields 1102-1108. The mapping 122c indicates which data from the case information 122e is appropriate to each field 1102-1108.

The field 1102 is a blank for insertion of the job title. The field 1104 is a blank for insertion of the applicant's first name. The fields 1106 are blanks for inserting information identifying the job, including title, city, and state. The field 1108 is a blank for inserting the hiring company's name.

Case Study

To illustrate the system 100's international and multi-lingual capabilities, the following illustration is provided, using a fictional job for a fictional company called Dover Consulting, Inc. Dover has a company headquarters in Helena, Mont. with a growing division in Beijing China. In the past, Dover needed to hire expensive recruitment agencies in Beijing to find staff. While they have been successful, Dover executives are convinced there is a better, cheaper and faster way to accomplish the same thing. Dover has hired an RPO that utilizes the system 100 in order to provide a higher quality of recruiting service, which is faster and more cost effective than before. Dover is focused on applying this technology for its business in China.

The recruiting consultant (108) profiles the job in English with the hiring manager Phil (108), extracting the essence of the job. Some primary elements include what specifically needs to get done by when, how this person's success will be measured, why the right person would want the job and what are the attributes of the top performers in the company.

With this information, the recruiting consultant 108 writes a recruitment plan, which includes a compelling job description, fifteen to twenty five multiple choice initial screening questions with recommended scoring, and four to eight behavioral based questions. The recruiting consultant enters the recruitment plan into the system 100 (602). The server 122 records the recruitment plan in the case information 122e. Also, the server 122 assesses (604) the recruitment plan to make sure it is complete. With hiring manager approval, the recruiting consultant 108 instructs the system 100 to translate (604).

If the hiring manager 108 requires that all responses be in a single language (like English), then this is reflected in the recruitment plan (or in auxiliary parameters and options associated with the recruitment plan) and documented in case information 122e. In this case, the recruitment plan directs the system 102 to limit translation (604) to the job descriptions and keywords. In this event, upon eventual launch (608), the server 102 will direct applicants to the English version of the screening questions, behavioral questions, and resume capture. The job description (to be posted on the web site 132) will reflect this preference so job applicants 106 reading the Mandarin version would know and expect the application process to be in English. In the case of Dover Consulting, the hiring manager 108 prefers to have a complete Mandarin application process and an English application process.

As part of step 604, the server 122 forwards the recruitment plan to a previously identified and trained English/Chinese translator 112 who translates the recruitment plan and related keywords. The translator 112 returns all translated elements back to the server 122 using the web site 132, and particularly, one or more web pages presenting an interface designed specifically for this purpose. In situations requiring translation into multiple languages, like Mandarin and Cantonese, the server 122 initiates (604) the translation process with translators 112 appropriate to each of the designated languages. In cases where the language preference for the referral source 110 is not known, the server 122 uses the predominant language for the job's location (in this case, Mandarin) as a default.

Next, the hiring manager 108 approves the recruitment plan in the originating language (step 606). After 606, the server 122 will either (1) launch the recruitment plan immediately, regardless of whether all translations have been completed, or (2) remain in a "pending translation" state until all the translations are completed, and then launch. The server 122 observes one or the other of these alternatives, according to the directions programmed into the workflow and rules 122b (as derived from the recruitment plan or in auxiliary parameters and options associated with the recruitment plan). Alternatively, the server 122 may be programmed to avoid selecting between these alternatives on its own, instead prompting the hiring manager 108 or other personnel 108 for specific instructions. The option to stagger the launching of the translated versions allows for faster responsiveness when needed by the hiring manager 108 and company. This also accommodates additional translations if necessary for job information that is already active.

In the case where the recruitment plan is "launched" immediately in the originating language while translations are being completed, contact (608) of referral source contacts 110 will be limited to those who have indicated a preference for this language (as logged in the case information 122e). In this case, the originating language is English, so very few members are contacted because the predominant language where the job is located, Beijing, is Mandarin. With the Mandarin translations are completed, step 608 includes in its identification of appropriate contacts all referral source contacts 110 where Mandarin is the stated language preference and Beijing is the stated locale.

In the case where the recruitment plan is "launched" upon completion of all translations, as part of the launch operation (608) the server 122 keeps track of the progress of each translation and sends reminder messages to the translators 112 if the translations are not completed in a predetermined timeframe. The server 122 also posts information concerning translation progress on the web site 132 for review by the recruiting consultant 108 and hiring manager 108. Ultimately, the server 122 in this embodiment launches (608) the recruitment plan when the server 122 receives all completed translations (604), and also receives approval of the translations (606) by the hiring manager 108 or his designate 108. The server 122 then proceeds to the step of reaching out to referral source contacts 110 and incorporating other sources as defined below.

Outreach (part of the launch 608) is accomplished in three primary ways. First, the server 122 identifies and communicates to a targeted number of referral source contacts 110 identified uniquely for this job in Beijing. The system 122 selects them (508, FIG. 5) because they have a high probability of being or knowing the person for this job. As part of step 608, the system 100 sends each targeted contact a personalized e-mail message in Mandarin, reflecting the culture, style, locale-specific formatting and dialect appropriate for that area. The templates 122c for these messages were previously developed (manually by recruitment personnel 108, for example) and stored in the server 122 at 122c. If there are people in the target area who have selected English as their preferred language, the server 122 will make sure their personalized messages and a link to the job will occur in English. The job's link and corresponding application process, including the screening questions and behavioral questions, occur in the addressee's preferred language if known (unless the hiring manager 108 specifically requires applications to be in only one language as previously described). If not known, the system defaults to the language associated to the job's location. In this case, the default language would be Mandarin.

In all cases, the job posting will have a unique URL for each language. Further, the job description includes icons, flags, abbreviations, or other indications as to whether other translations are available. For example, for an addressee who either has a preference for Mandarin or the preference is unknown (which defaults to Mandarin), the server 122 will send (608) e-mail in Mandarin with a link to the Mandarin job description. When the addressee selects the message's URL, this leads to a web page (132) containing an indication at the top of the job description indicating that an English version is also available. If the user selects English, the job description and corresponding application process will switch to English.

The second method of outreach, in addition to targeted referrals, is postings (926) to job boards. When setting up each region, recruiting personnel 108 will manually identify job boards by job type and level, and indicate the languages supported. They will also enter this information to the server 122 for recording in the case information 122e, for example, as part of setting up the recruitment plan (602).

A third type of outreach, in addition to targeted messages and job board postings, includes the use of various other candidate contact 110 sources, such as user groups, alumni associations, professional organizations, etc. As part of developing the recruitment plan, recruiting personnel 108 identify these additional candidate sources by job type and level, and indicate the languages supported. Recruiting personnel 108 enter this information in the system, which is stored as case information 122e.

As job applicants 106 apply (610) in Mandarin, the server 122 alerts the hiring manager and prompts for translation into English (step 610). If the hiring manager 108 makes a decision to translate, the server 122 forwards (610) the candidate's completed behavioral questions and resume to the designated translator 112. Once translated, the server 122 includes this information on a web site (132) console available to the hiring manager, which presents the hiring manager 108 with options to toggle between the English and Mandarin versions. Nevertheless, since the screening questions are multiple choice, the web site 132 in one embodiment may relay applicants' responses to the screening questions immediately to the hiring manager (such as by posting on the web site 132) without requiring any follow-up translation.

As each job applicant 106 progresses through the selection process (610), the system 100 conducts systematic communications in the applicant's preferred language. If the job posting is updated (changes to job description, screening questions, and behavioral questions), the server 122 automatically initiates appropriate translation requests and incorporates the updates into the job posting upon completion by the translator 112. All reporting and user interfacing is available in each supported language, in this case Mandarin and English.

C. Other Embodiments

Throughout this disclosure, reference is made to "employment recruiting." This provides a useful foundation for numerous examples that help illustrate certain components and features. However, this is not intended to be limiting. The illustrated components and processes may be applied to other purposes, such as temporary employment, staffing, staff leasing, etc. Another potential application is that of soliciting, receiving, evaluating, and accepting bids for products or services. Ordinarily skilled artisans, having the benefit of this disclosure, will also recognize a variety of other potential applications involving the coordination of a multi-stage process with many remote participants that speak different languages.

And, while the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 36 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing employment recruiting communications comprising computer-implemented operations of:
   receiving from recruiting personnel computer-readable communications including a recruitment plan in a natural language, the recruitment plan comprising at least: a description of a given job;
   under first prescribed conditions, conducting computer-readable communications to initiate and obtain natural language translation by a human translator of some or all of the recruitment plan including: the description of the given job, keywords only, everything in the recruitment plan;
   launching a job search comprising: making the recruitment plan including any translation available to candidates by posting some or all of the recruitment plan upon one or more Internet web sites, identifying people including: people likely to be a candidate for the described job and reside within a threshold proximity of a prescribed job site, people likely to know said people likely to be a candidate, retrieving and completing one or more pre-stored templates to form personalized computer-readable solicitations directed at the identified people and reflecting language appropriate to the identified people, transmitting the completed solicitations to the identified people;
   after launching the job search, operating a central communications server to observe a predetermined workflow for collection, evaluation, forwarding, generation, and notification as to communications arising from the job search and occurring among some or all of the following: applicants, job candidates, the identified people, hiring authorities, recruiting personnel, referral sources;
   further operating the central communications server to perform operations including, under second predetermined conditions, obtaining natural language translation of items of the communications arising from the job search, the items comprising any of: recruitment plan, identified people, and complete solicitations, the obtaining of natural language translation comprising one or more of the following: performing automated natural language translation by applying a stored natural language translation database to said items, initiating and obtaining natural language translation by a human translator of said items.

2. The method of claim 1, where said obtained natural language translations and said completed templates demonstrate language appropriate to targeted audience members, where language includes one or more of: a written system used to communicate and including a set of symbols and a set of rules or grammar governing the manipulation of the symbols, localization features including one or more of dialect, local culture, local style.

3. The method of claim 1, where the localization features include localization of terms including one or more of text, numbers, currency, dates, times, address formats, postal codes, telephone number formats.

4. The method of claim 1, where:
   the operations further comprise: transmitting computer-readable notification of recruitment plan availability to a designated approver, and making the recruitment plan including any natural language translation available to the designated approver;
   the operation of launching the job search is conducted responsive to approval by the designated approver.

5. The method of claim 1, where the first predetermined conditions include one of:
   upon receipt of approval by a designated person;
   automatically if a prescribed geographical job search area includes regions whose population is not fluent in the first natural language.

6. The method of claim 1, where:
   the recruitment plan further includes an applicant screening questionnaire specific to the given job;
   the second predetermined conditions include: automatically as to applicant responses to the screening questionnaire and applicant-submitted resumes residing in a language other than a preferred language of the recruiting personnel.

7. The method of claim 1, where the operation of operating a central communications server to observe a predetermined workflow for collection, evaluation, forwarding, generation, and notification as to communications arising from the job search includes, under prescribed circumstances, retrieving, completing, and transmitting one or more pre-stored templates to form personalized computer-readable solicitations reflecting language appropriate to intended recipients.

8. The method of claim 7,
   further comprising providing a source template set including various templates written in a given language and conveying various messages, and providing at least one additional template set written in a different language than the given language, the additional template set including templates conveying said various messages and serving as counterparts to the templates of the source template set;

where each of the templates includes blanks whose content is determined by a predetermined mapping to case information;

where each of said operations of retrieving and completing one or more pre-stored templates comprises:

identifying language appropriate to an intended recipient;

selecting from the template set written in the identified language a template conveying a desired message;

utilizing the predetermined mapping to identify items of stored case information to complete blanks of the selected template;

if the stored case information resides in a different language than the identified language, applying a computer-readable natural language translation database to obtain natural language translation of the identified items of stored case information;

utilizing identified items of stored case information, including any obtained natural language translation, to complete the selected template.

9. The method of claim 1, the operations further comprising:

repeating the operation of launching of the job search while iteratively expanding the threshold proximity;

where in each repeated launch of the job search, the operations of making the recruitment plan available and retrieving and completing pre-stored templates are conducted utilizing all languages appropriate to the expanded proximity.

10. The method of claim 1, where:

the operation of making the recruitment plan available to candidates includes posting some or all of the recruitment plan upon one or more Internet web sites in at least the first natural language;

the operation of launching the job search further includes, pending completion of the natural language translation of the recruitment plan, limiting the transmission of solicitations to those of the identified people known or likely to be fluent in the first natural language, and those of the identified people not known or likely to be fluent in the first natural language but having pre-registered a desire to receive job listings in the first natural language.

11. The method of claim 1, the operation of launching the job search comprising:

for each identified person having pre-registered a desire to receive job listings in a given language, only transmitting the solicitation to said person upon receipt from the human translator of natural language translation into the given language and posting of the recruitment plan including the natural language translation into the given language.

12. The method of claim 1, the method of launching the job search comprising:

for each identified person whose language preference is unknown, only transmitting the solicitation to said person if said person resides in a region whose population is fluent in any of the following: the first natural language, a language for which natural language translation of the recruitment plan has been obtained.

13. A process for managing employment recruiting with automated natural language translation, the process comprising operations of:

providing pre-prepared first natural language web sites containing job postings and application information and providing counterpart web sites containing pre-prepared natural language translations of the first natural language web sites in one or more predetermined languages different than the first natural language;

responsive to a communications server receiving users' computer-readable communications submitted by completing forms upon the web sites, the communications server performing computer-implemented operations comprising:

determining if natural language translation of the computer-readable communications is required by predetermined rules, and if so, effecting the translating by performing at least one of: computer-implemented operations of applying a natural language translation database to the computer-readable communications, obtaining natural language translation of the computer-readable communications by a human translator;

consulting a predetermined workflow and contacts list to identify one or more recipients appropriate to circumstances of the completed form, and then performing one or more of the following: generating an e-mail message containing the received computer-readable communications including any required natural language translation and sending the generated e-mail to the identified recipients, notifying the identified recipients of receipt of the computer-readable communications and making the computer-readable communications including any required natural language translation available on demand at one or more of the web sites;

responsive to users' completion of prescribed tasks via the web sites, the communications server performing computer-implemented operations comprising:

referencing a predetermined workflow and contacts list to identify the following: one or more addressees as appropriate to the completed task, one or more pre-stored communications templates containing a message appropriate to the completed task and utilizing a language appropriate to the identified addressees;

retrieving and filling-out the identified templates to form personalized electronic communications directed at the identified addressees;

performing one of the following: generating e-mail messages containing the personalized electronic communications and sending the generated e-mail messages to the identified addressees, notifying the identified addressees of availability of the personalized electronic communications and making the personalized electronic communications available to the identified addressees on demand at one or more of the web sites.

14. A computer-implemented employment recruiting management process implementing a predetermined multi-stage employment recruiting framework, the process comprising computer-implemented operations of:

initiating a job search including conducting Internet posting of information including at least a job description and selecting and filling-in and transmitting template-based computer-readable solicitations directed at pre-selected candidates and referral sources; and causing a communications server to serve as a communications hub to act in accordance with predetermined workflow to receive, forward, and generate subsequent communications arising from the job search and involving job applicants, referral sources, and recruiting personnel;

where each of the operations of initiating the job search and said communications server serving as the communications hub further comprises determining if predetermined criteria call for natural language translation to facilitate communications among participants of different languages, and if so, automatically negotiating natural language translation; and where the negotiation of natural language translation includes computer-implemented operations of: under first conditions, performing natural language translation by applying a computer-readable natural language translation dictionary, under second conditions, obtaining natural language translation by a human translator.

15. A computer readable medium storing a program to perform operations comprising:

receiving from recruiting personnel computer-readable communications including a recruitment plan in a first natural language, the recruitment plan comprising at least: a description of a given job;

under first prescribed conditions, conducting computer-readable communications to initiate and obtain natural language translation by a human translator of some or all of the recruitment plan including: the description of the given job, keywords only, everything in the recruitment plan;

launching a job search comprising: making the recruitment plan including any natural language translation available to candidates by posting some or all of the recruitment plan upon one or more Internet web sites, identifying people including: people likely to be a candidate for the described job and reside within a threshold proximity of a prescribed job site, people likely to know said people likely to be a candidate, retrieving and completing one or more pre-stored templates to form personalized computer-readable solicitations directed at the identified people and reflecting language appropriate to the identified people, transmitting the completed solicitations to the identified people;

after launching the job search, operating a central communications server to observe a predetermined workflow for collection, evaluation, forwarding, generation, and notification as to communications arising from the job search and occurring among some or all of the following: applicants, job candidates, the identified people, hiring authorities, recruiting personnel, referral sources;

further operating the central communications server to perform operations including, under second predetermined conditions, obtaining natural language translation of items of the communications arising from the job search, the items comprising any of: recruitment plan, identified people, and complete solicitations, the obtaining of natural language translation comprising one or more of the following: performing automated natural language translation by applying a stored natural language translation database to said items, initiating and obtaining natural language translation by a human translator of said items.

16. A computer readable medium storing a program to perform computer-implemented operations to implement a predetermined multi-stage employment recruiting framework, the operations comprising:

initiating a job search including conducting Internet posting of information including at least a job description and selecting and filling-in and transmitting template-based computer-readable solicitations directed at pre-selected candidates and referral sources; and causing a communications server to serve as a communications hub to act in accordance with predetermined workflow in receiving, forwarding, and generating subsequent communications arising from the job search and involving job applicants, referral sources, and recruiting personnel;

where each of the operations of initiating the job search and said communications server serving as the communications hub further comprises determining if predetermined criteria call for natural language translation to facilitate communications among participants of different languages, and if so, automatically negotiating natural language translation; and where the negotiation of natural language translation includes computer-implemented operations of: under first conditions, performing natural language translation by applying a computer-readable natural language translation dictionary, under second conditions, obtaining natural language translation by a human translator.

17. A computer-driven apparatus of managing employment recruiting communications comprising:

a computer-readable natural language translation database;

case information containing computer-readable data specifying information about the following aspects of a job search: job applicants, candidates, referral sources, recruiting personnel, events in progression of the job search, and preferences of at least some of participants in the job search;

a first set of pre-stored computer-readable templates residing in a prescribed language, each template including blanks whose content is determined by a predetermined mapping to case information, said templates when completed forming personalized computer-readable solicitations set forth in the prescribed language;

one or more further sets of computer-readable templates, where templates in each further set correspond to template counterparts in the first set, each further set templates pertaining to a different language;

a computer-readable workflow setting forth a predetermined multi-stage employment recruiting framework;

a communications server programmed to perform operations comprising:

receiving from recruiting personnel computer-readable communications including a recruitment plan in a first natural language, the recruitment plan comprising at least: a description of a given job;

under first prescribed conditions, conducting computer-readable communications to initiate and obtain natural language translation by a human translator of some or all of the recruitment plan including: the description of the given job, keywords only, everything in the recruitment plan;

launching a job search comprising: making the recruitment plan including any natural language translation available to candidates by posting some or all of the recruitment plan upon one or more Internet web sites, referencing the case information to identify people including: people likely to be a candidate for the described job and reside within a threshold proximity of a prescribed job site, people likely to know said people likely to be a candidate, retrieving and completing one or more of the templates to form personalized computer-readable solicitations directed at the identified people and reflecting language appropriate to the identified people, transmitting the completed solicitations to the identified people;

after launching the job search, observing the workflow for collection, evaluation, forwarding, generation, and notification as to communications arising from the job search and occurring among some or all of the following: applicants, job candidates, the identified people, hiring authorities, recruiting personnel, referral sources;

the operation of observing the workflow further including, under second predetermined conditions, obtaining natural language translation of said items of the communications arising from the job search, the items comprising any of: recruitment plan, identified people, and complete solicitations, the obtaining of natural language translation comprising one or more of the following: performing automated natural language translation by applying the natural language translation database to said items, initiating and obtaining natural language translation by a human translator of said items.

18. A computer-driven employment recruiting communications system, comprising:

case information containing computer-readable data specifying information about the following aspects of a job search: job applicants, candidates, referral sources, recruiting personnel, events in progression of the job search, and preferences of at least some of participants in the job search;

a first set of pre-stored computer-readable templates residing in a prescribed language, each template including blanks whose content is determined by a predetermined mapping to case information, said templates when completed forming personalized computer-readable solicitations set forth in the prescribed language;

one or more further sets of computer-readable templates, where templates in each further set correspond to template counterparts in the first set, each further set templates pertaining to a different language;

a computer-readable natural language translation dictionary;

a computer-readable workflow setting forth a predetermined multi-stage employment recruiting framework;

a digital data processing engine programmed to perform operations to manage a predetermined multi-stage employment recruiting framework by observing the predetermined workflows as indexed by case information, said operations including:

initiating a job search including conducting Internet posting of information including at least a job description and also selecting, filling-in, and transmitting appropriate ones of the templates to pre-selected candidates and referral sources; and causing a communications server to serve as a communications hub to receive, forward, and generate subsequent communications arising from the job search and involving job applicants, referral sources, and recruiting personnel, the operation of serving as a communications hub acting in accordance with the workflow as indexed by the case information;

where each of the operations of initiating the job search and said communications server serving as the communications hub further comprises determining if predetermined criteria call for natural language translation to facilitate communications among participants of different languages, and if so, automatically negotiating natural language translation; and where the negotiation of natural language translation includes computer-implemented operations of: under first conditions, performing translation by applying the natural language translation dictionary, under second conditions, obtaining translation by a human translator.

19. A computer-driven employment recruiting communications system, comprising:

first means for storing case information comprising computer-readable data specifying information about the following aspects of a job search: job applicants, candidates, referral sources, recruiting personnel, events in progression of the job search, and preferences of at least some of participants in the job search;

a first set of pre-stored computer-readable templates residing in a prescribed language, each template including blanks whose content is determined by a predetermined mapping to case information, said templates when completed forming personalized computer-readable solicitations set forth in the prescribed language;

one or more further sets of computer-readable templates, where templates in each further set correspond to template counterparts in the first set, each further set templates pertaining to a different language;

second means for storing a computer-readable natural language translation dictionary;

third means for storing predetermined computer-readable workflows setting forth a predetermined multi-stage employment recruiting framework;

fourth means for managing a predetermined multi-stage employment recruiting framework by observing the predetermined workflows as indexed by the case information in order to perform operations comprising:

initiating a job search including conducting Internet posting of information including at least a job description and also selecting, filling-in, and transmitting appropriate ones of the templates to pre-selected candidates and referral sources; and causing a communications server to serve as a communications hub to receive, forward, and generate subsequent communications arising from the job search and involving job applicants, referral sources, and recruiting personnel, the operation of serving as a communications hub acting in accordance with the workflow as indexed by the case information;

where each of the operations of initiating the job search and said communications server serving as the communications hub further comprises determining if predetermined criteria call for natural language translation to facilitate communications among participants of different languages, and if so, automatically negotiating natural language translation; and where the negotiation of natural language translation includes computer-implemented operations of: under first conditions, performing natural language translation by applying the natural language translation dictionary, under second conditions, obtaining natural language translation by a human translator.

20. A computer-implemented employment recruiting management system programmed to implement a predetermined multi-stage employment recruiting framework by performing computer-implemented operations comprising:

initiating a job search including conducting Internet posting of information including at least a job description and selecting and filling-in and transmitting template-based computer-readable solicitations directed at pre-selected candidates and referral sources; and causing a communications server to serve as a communications hub to act in accordance with predetermined workflow to receive, forward, and generate subsequent communications arising from the job search and involving job applicants, referral sources, and recruiting personnel;

where each of the operations of initiating the job search and said communications server serving as the communications hub further comprises determining if predetermined criteria call for natural language translation to facilitate communications among participants of different languages, and if so, automatically negotiating natural language translation; and where the negotiation of natural language translation includes computer-implemented operations of: under first conditions, performing natural language translation by applying a computer-readable natural language translation dictionary, under second conditions, obtaining natural language translation by a human translator.

* * * * *